US010189972B2

(12) United States Patent
Stibor et al.

(10) Patent No.: US 10,189,972 B2
(45) Date of Patent: Jan. 29, 2019

(54) MOLDING MATERIAL (71) Applicant: The Gillette Company, Boston, MA (US)

(72) Inventors: Lena Stibor, Bad Soden (DE); Gerald Goerich, Weiterstadt (DE); Dagmar Koppler, Rothenburg (DE); Viktor Kraft, Wiesbaden (DE); Harald Schnizer, Kronberg (DE)

(73) Assignee: The Gillette Company LLC, Boston, MA (US)

( * ) Notice: Subject to any disclaimer, the term of this patent is extended or adjusted under 35 U.S.C. 154(b) by 303 days.

(21) Appl. No.: 15/207,609

(22) Filed: Jul. 12, 2016

(65) Prior Publication Data
US 2018/0016408 A1    Jan. 18, 2018

(51) Int. Cl.
C08K 3/22 (2006.01)
B29B 7/90 (2006.01)
B29C 45/00 (2006.01)
B29C 47/00 (2006.01)
C08J 5/00 (2006.01)
C08K 3/34 (2006.01)
C08K 3/38 (2006.01)
C25D 9/02 (2006.01)
B29K 25/00 (2006.01)
B29K 105/16 (2006.01)

(52) U.S. Cl.
CPC ............... *C08K 3/22* (2013.01); *B29B 7/90* (2013.01); *B29C 45/0001* (2013.01); *B29C 47/0004* (2013.01); *C08J 5/00* (2013.01); *C08K 3/34* (2013.01); *C08K 3/38* (2013.01); *C25D 9/02* (2013.01); B29K 2025/08 (2013.01); B29K 2105/16 (2013.01); C08J 2325/12 (2013.01); C08K 2003/2227 (2013.01); C08K 2003/2265 (2013.01); C08K 2003/385 (2013.01)

(58) Field of Classification Search
CPC .................................... C08K 3/22; C08K 3/38
See application file for complete search history.

(56) References Cited

U.S. PATENT DOCUMENTS

| 4,798,856 A | 1/1989 | Ayala et al. |
| 4,814,018 A | 3/1989 | Tsurumaru et al. |
| 4,987,165 A | 1/1991 | Orikasa et al. |
| 5,900,313 A | 5/1999 | Nishihara et al. |
| 6,300,399 B1 | 10/2001 | Gallucci et al. |
| 6,344,509 B1 | 2/2002 | Mizutani |
| 6,921,789 B2 | 7/2005 | Booth et al. |
| 7,956,126 B2 | 6/2011 | Tamai et al. |
| 8,202,459 B2 | 6/2012 | Kurihara et al. |
| 2003/0119963 A1 | 6/2003 | Nippa et al. |
| 2010/0160190 A1 | 6/2010 | Kuvshinnikova et al. |
| 2011/0281128 A1 | 11/2011 | Goerich et al. |
| 2013/0172444 A1 | 7/2013 | Shin et al. |
| 2014/0155528 A1 | 6/2014 | Onoue et al. |
| 2014/0230692 A1* | 8/2014 | Hofener .................. C23C 4/04 106/204.01 |
| 2015/0034858 A1 | 2/2015 | Raman et al. |

FOREIGN PATENT DOCUMENTS

| EP | 0287045 | 10/1988 |
| JP | 55104339 | 8/1980 |
| JP | 64045443 | 2/1989 |

OTHER PUBLICATIONS

Database WPI, Week 198038, Thomson Scientific, London, GB; AN 1980-67000C, XP002774363, & JP S55 104339A (Asahi Dow LTD), Aug. 9, 1980 Abstract.
Database WPI, Week 198901, Thomson Scientific, London, GB; AN 1989-004506, XP002774364, & JP S63 284262A (Kishimoto Sangyo Co.), Nov. 21, 1988 Abstract.
Database WPI, Week 199327, Thomson Scientific, London, GB; AN 1993-217017, XP002774365, & JP H05 140448A (Nippon Steel Chem Co.), Jun. 8, 1993 Abstract.
Database WPI, Week 200504, Thomson Scientific, London, GB; AN 2005-034961, XP002774366, & JP 2004 352890A (Daisei Kogyo KK), Dec. 16, 2004 Abstract.
PCT International Search Report with Written Opinion in corresponding international application PCT/US2017/040789 dated Oct. 1, 2017.

* cited by examiner

Primary Examiner — Peter D. Mulcahy
(74) Attorney, Agent, or Firm — Kevin C. Johnson (57) ABSTRACT A molding material having from about 10 weight percent to about 25 weight percent of an amorphous thermoplastic resin, from about 3 weight percent to about 25 weight percent of aluminum oxide, boron nitride or aluminum silicate and from about 65 weight percent to about 87 weight percent of iron oxide.

4 Claims, 6 Drawing Sheets

| TEST-NO. | 20% SAN<br>80% IRON OXIDE | 20% SAN<br>5% ALUMINUM OXIDE<br>75% IRON OXIDE | 15% SAN<br>10% ALUMINUM OXIDE<br>75% IRON OXIDE | 17% SAN<br>16% ALUMINUM OXIDE<br>67% IRON OXIDE |
|---|---|---|---|---|
| SPECIFIC WEIGHT (g/cm$^3$) | 2.91 | 2.95 | 2.99 | 3.06 |
| 1 | 21 | 16 | 13 | 9 |
| 2 | 20 | 16 | 13 | 9 |
| 3 | 20 | 16 | 13 | 10 |
| 4 | 21 | 16 | 13 | 9 |
| 5 | 20 | 16 | 14 | 9 |
| 6 | 20 | 16 | 13 | 8 |
| 7 | 20 | 16 | 13 | 9 |
| 8 | 20 | 16 | 13 | 9 |
| 9 | 20 | 16 | 13 | 9 |
| 10 | 20 | 16 | 13 | 9 |
| AVERAGE (cm) | 20.2 | 16 | 13.1 | 9 |
| CONTENT Al-Ox (%) | 0 | 5 | 10 | 16 |

| HEAT TRANSFER RATE [W/m*K] | 0.87 | 0.96 | 1.2 | 1.43 |
|---|---|---|---|---|
| | 0.89 | 1.06 | 1.22 | 1.41 |
| | 0.88 | 1.01 | 1.23 | 1.44 |
| AVERAGE VALUE [W/m*K] | 0.88 | 1.01 | 1.21666667 | 1.42666667 |

MOLDING MATERIAL

FIELD OF THE INVENTION

The invention relates to a molding material, and more particularly to a molding material having a high specific gravity and good thermal conductivity.

BACKGROUND OF THE INVENTION

The use of molding materials having a relatively high specific gravity is known. Such molding materials contain a polymeric resin and a high density filler such as iron oxide. However, in such molding materials the amount of iron oxide which can be included is limited as the thermal conductivity properties of the molding material are relatively poor. Lower thermal conductivity leads to relatively longer cycle times to allow the molding material to cool after molding. In comparison, the molding materials having metal based fillers with a higher thermal conductivity leads to relatively smaller process windows because the material has poor flow characteristics and cools relatively fast.

Many heavy polymeric materials are filled with high heat conductive additives such as metal powder or fibers. The addition of these materials leads to tight process windows in molding because of the immediate freezing when the molten material contacts the cold wall of the tool. This fast freezing leads to high injection speed and low flow length to wall thickness ratio at the produced part.

It is an object of the present invention to provide a molding material having a high specific gravity and optimally controlled thermal conductivity properties to reduce or expand the time needed for the molding material to cool during or after injection.

SUMMARY OF THE INVENTION

One aspect of the invention relates to a molding material. The molding material comprises from about 10 weight percent to about 25 weight percent of an amorphous thermoplastic resin, from about 3 weight percent to about 25 weight percent of aluminum oxide, boron nitride or aluminum silicate and from about 65 weight percent to about 87 weight percent of iron oxide.

The amorphous thermoplastic resin may be selected from the group consisting of acrylonitrile butadiene styrene, polystyrene, and styrene acrylonitrile.

The amorphous thermoplastic resin may be a styrene resin. The styrene resin may be styrene acrylonitrile.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

The present invention relates to a high specific gravity molding material appropriate for injection molding or extrusion molding. A high specific gravity molding material high in surface hardness, excellent in coating characteristics as well as excellent in thermal conductivity is provided.

High specific gravity molding materials are known. Such high specific gravity materials contain iron oxide and a resin. However, in such molding materials the amount of iron oxide which can be included is limited as the thermal conductivity properties of the molding material containing iron oxide are relatively low. Low thermal conductivity leads to longer cycle times to allow the molding material to cool after molding.

The present inventors have found that a high percentage of iron oxide can be maintained in the molding material while improving on the thermal conductivity properties of the molding material. The molding material of the present invention comprises an amorphous thermoplastic resin, aluminum oxide, boron nitride or aluminum silicate and iron oxide. Preferably, the molding material of the present invention contains from about 10 weight percent to about 25 weight percent of an amorphous thermoplastic resin, from about 3 weight percent to about 25 weight percent of aluminum oxide, boron nitride or aluminum silicate and from about 65 weight percent to about 87 weight percent of iron oxide.

The resin for use in the present invention is an amorphous thermoplastic resin. Preferably the amorphous thermoplastic resin is selected from the group consisting of acrylonitrile butadiene styrene, polystyrene, and styrene acrylonitrile. Preferably, the amorphous thermoplastic resin is a styrene resin. More preferably the styrene resin is styrene acrylonitrile. Styrene acrylonitrile "SAN" is used as it possess high thermal resistance properties. The acrylonitrile units in the chain enable SAN to have a glass transition temperature greater than 100° C. The properties of SAN allow for reduced cycle time due to relatively earlier and quicker transition temperature. Amorphous polymers are more suitable for heavy resin compounds of the present invention due to the glass transition temperature Tg at which an amorphous polymer is transformed, in a reversible way, from a viscous or rubbery condition to a hard one. By injection molding of the heavy resin material of the present invention the temperature of the material melt is above the Tg region (viscous or rubbery condition). During cooling the compound attains the high Tg temperature early and reaches dimensional stability (glassy condition). Over-molding of the heavy resin material is possible as the materials stays dimensional stable due to the Tg of the material.

In the present invention, the addition of the aluminum oxide, boron nitride or aluminum silicate provides the molding material with much improved thermal conductivity compared to materials containing a styrene resin and iron oxide. This improved thermal conductivity leads to lower cycle times as the molding material takes less time to cool after molding.

Another benefit from the addition of aluminum oxide, boron nitride or aluminum silicate to the molding material is the ability to increase the overall amount of iron oxide in the molding material compared with iron oxide and resins of the past. The improvements in the molding material properties come from the addition of relatively small amounts of aluminum oxide, boron nitride or aluminum silicate.

The molding material composition is made by blending the amorphous thermoplastic resin with the powder of aluminum oxide, boron nitride or aluminum silicate with iron oxide powder. Increasing the amount of iron oxide within the molding material composition has the advantage of providing a lower cost molding material as iron oxide powder has a lower cost than the other filling agents.

Methods for blending the amorphous thermoplastic resin, aluminum oxide, boron nitride or aluminum silicate powder and iron oxide powder include a uniaxial extruder, a biaxial extruder, a kneader, a Banbury mixer, a roll and other such methods can be used.

After blending the molding material is heated to become flowable. The flowable molding material may then be molded into an article by either injection molding or extrusion molding. Such articles will have a relatively heavy weight given the high percentage of iron oxide in the molding material. Examples of moldable articles include but are not limited to: razor handles, shaving cartridges, dry shavers, components of shaving cartridges and dry shavers, toothbrush handles, packaging and containers, writing utensils, cutlery, office items such as staplers, tape dispensers, kitchen items such as scissors and cutting instruments, household items such as phones, trays, cups, etc.

In an additional step, the article may be electroplated to add improved appearance and a pleasant feel. Thermoplastic elastomers are well suited for electroplating as they allow for the creation of both hard and soft composite components to be electroplated selectively in one operation.

Figure 1:
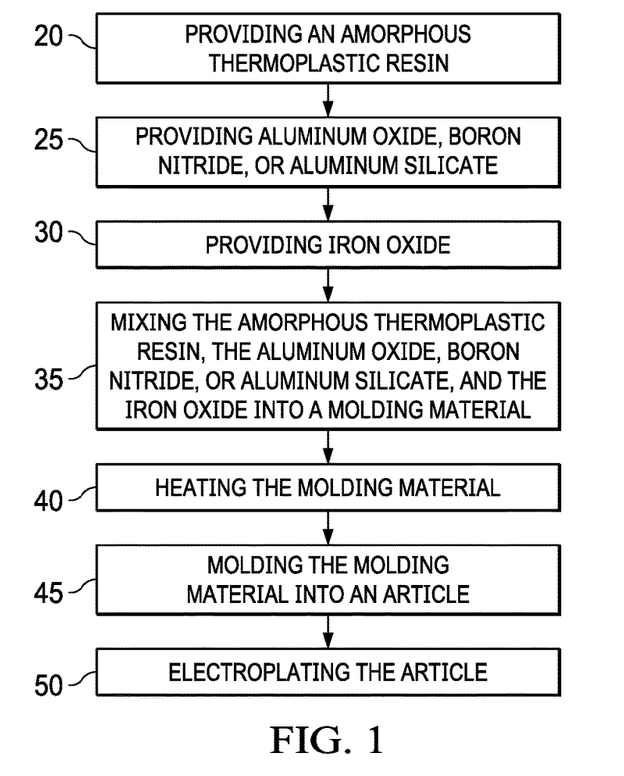
FIG. 1 is a diagram of a flow chart for molding the molding material into an article.

Referring now to FIG. 1, there is shown a diagram of a flow chart showing the steps of making an article. An amorphous thermoplastic resin is provided at 20. Aluminum oxide, boron nitride or aluminum silicate is provided at 25. Iron oxide is provided at 30. At 35, the amorphous thermoplastic resin, the aluminum oxide, boron nitride or aluminum silicate, and the iron oxide are mixed into a molding material. The molding material is then heated into a flowable condition at 40. The heated and flowable molding material is molded into an article at 45. The molding step may be either an injection molding or extrusion molding. The optional step of electroplating the article is shown at 50.

Figure 2:
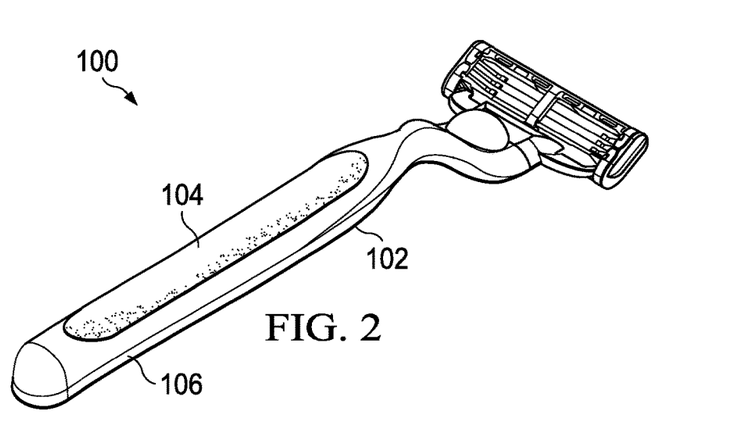
FIG. 2 is a perspective view of an exemplary article made from the molding material of the present invention.

Referring now to FIG. 2, an article 100 is shown. Article 100 is a handle 102 for a razor. The handle 102 is formed using the process flow chart of FIG. 1. The handle 102 is molded from a molding material of the present invention. In addition, the handle 102 has undergone electroplating with any additional material, for example a thermoplastic elastomer or a transparent material to create a soft region 104. Soft region 104 improves the comfort and feel of the handle 102. The electroplating of the handle 102 creates a metal layer on the region 106 directly on the molding material of the present invention to improve the appearance of the handle 102. The electroplating also creates hard region 106 to improve the appearance of the handle 102.

The developed heavy weight resin is an alternative to metal/zinc-die-cast material. The molding material of the present invention enables to offer an attractive solution in regard to the manufacturing process, price and environment. This alternative allows the product to have the look and feel in the final state like a metal product. At the same time the material of the present invention should be easily processable by injection molding and saves on the assembly effort. For example, for the process of the present invention there are three basic steps required, injection molding of the part such as a handle 102, two-component injection molding of hard material 106 and soft material 104, and electroplating of the handle. In contrast when using a zinc-die-cast material five steps are needed: manufacturing of the zinc-die-casted main part, deflashing of the main part, electroplating the main part, separately producing a soft material part, and assembling the main part with the separately produced soft material part.

A lubricant may be added to the molding material to improve the molding processing fluidity.

Figure 6:
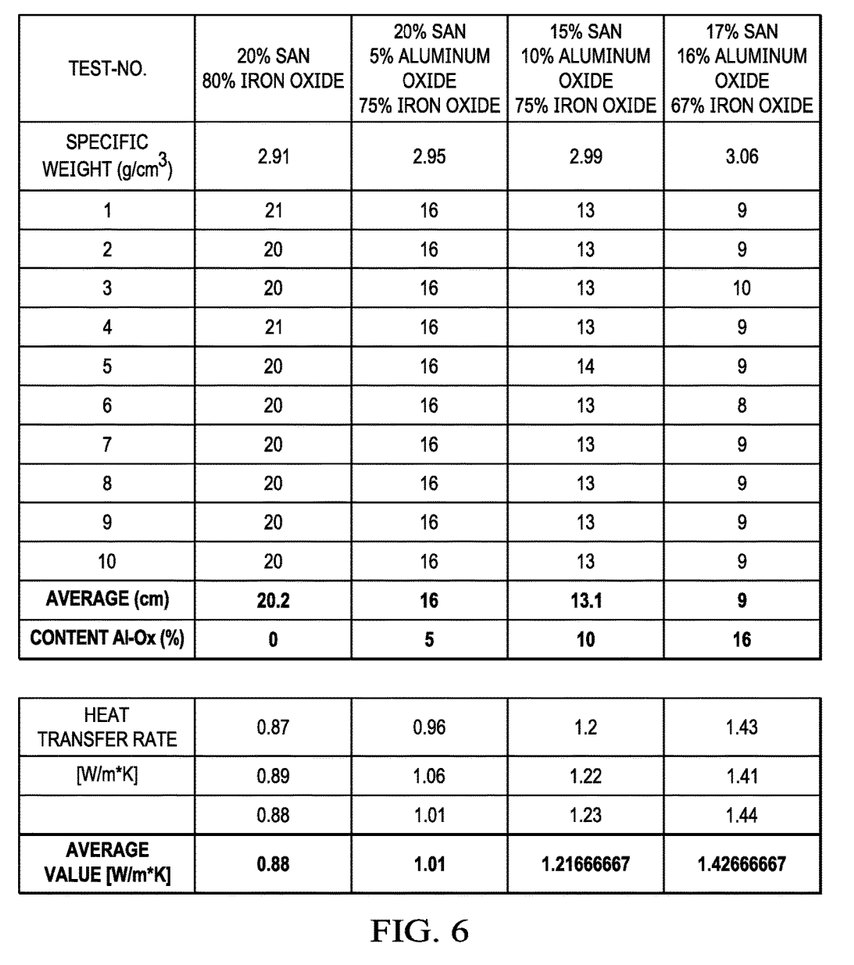
FIG. 6 is Table 1 showing the flowability and heat transfer results of several different formulas.
Figure 7:
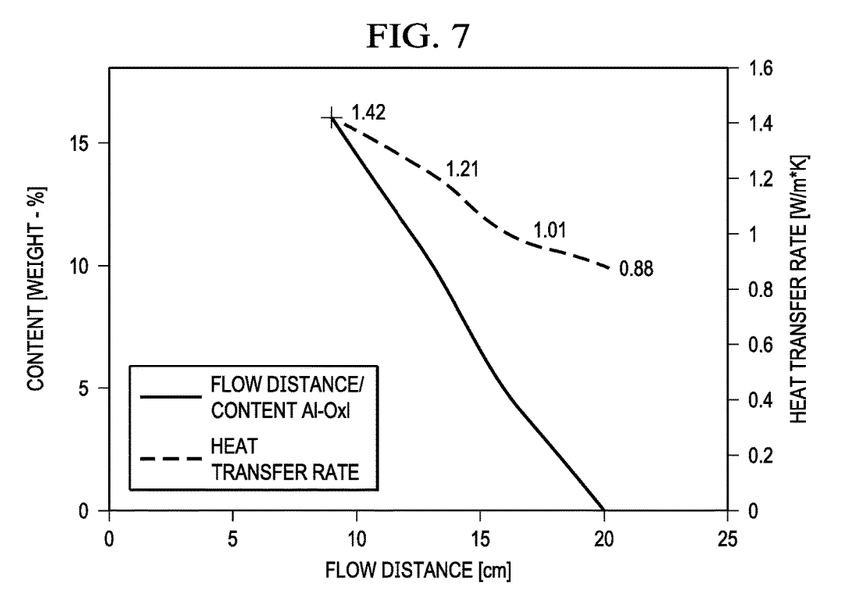
FIG. 7 is Table 2 showing a graph of the average results of heat transfer and flow distance of the formulas from Table 1.

Referring to FIG. 6, Table 1 shows the flowability and heat transfer results of several different formulas. Referring to FIG. 7, Table 2 is a graph plotting the average results of heat transfer and flow distance of the formulas from Table 1. As can be seen, different fillers and different concentrations of fillers control the thermal conductivity or heat transmission and flowability of the material.

The use of boron nitride or aluminum silicate showed very similar results to that of aluminum oxide depicted in Tables 1 and 2 above.

The heat energy and shear heating affect the fluidity of the heavy resin material and thereby the process window for effective injection molding process can be exactly controlled.

There are several advantages with the molding material of the present invention. The product produced with the molding material of the present invention looks and feels like a heavy metal product and it is resistant to corrosion. The material also has manufacturing advantages and cost saving advantages with fast cycle times due to its heat transfer properties compared to metal inserted or die-casted handles and products with assembled component parts. The molding material of the present invention requires less energy and other essential resources for manufacturing in comparison to zinc-die casted products.

For the compound that is highly loaded with fillers, the molding material of the present invention shows optimized mechanical properties, in particular dimensional stability under heat and impact strength due to the improved melt viscosity and glass transition temperature.

The molding material of the present invention possesses the ability to adhere to other components, e.g., substrates and resins, which is important for multicomponent injection molding.

Figure 3:
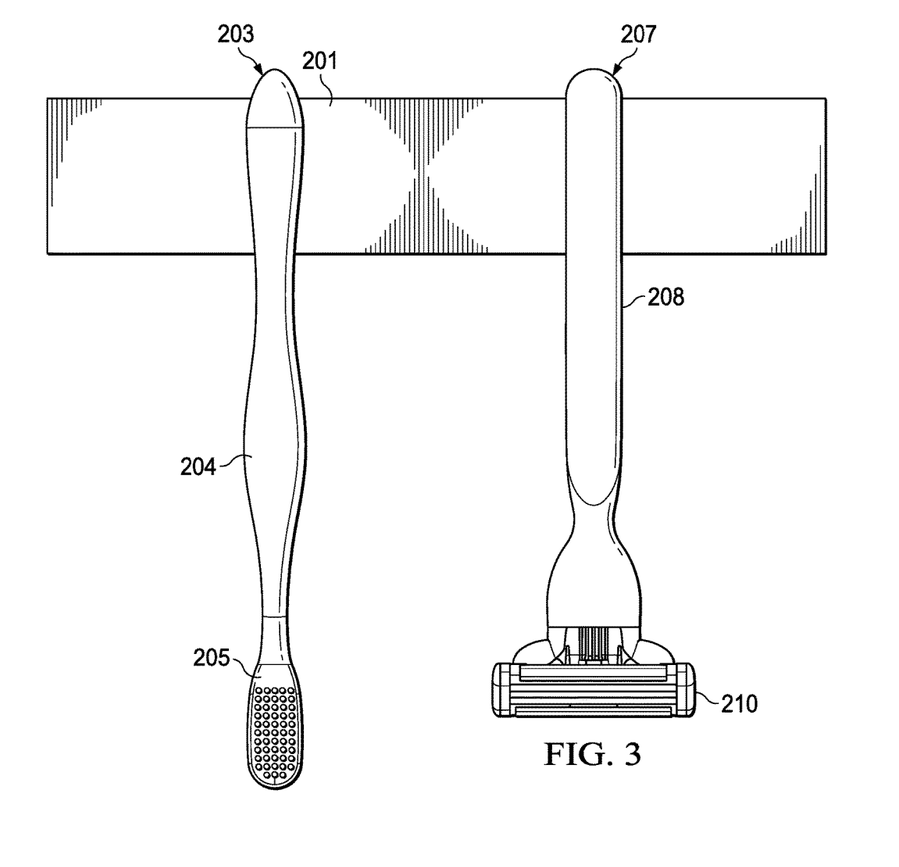
FIG. 3 is a view of products having handles made from the molding material of the present invention secured to a magnetic strip.

The molding material of the present invention possess magnetic and ferrimagnetic properties. Referring now to FIG. 3, there is shown a magnetic strip 201. Hanging on magnetic strip 201 are toothbrush 203 and razor 207. Toothbrush 203 comprises a handle 204 and head 205. Handle 204 is made from the molding material of the present invention making it magnetically attracted to magnetic strip 201. Razor 207 comprises handle 208 and shaving cartridge 210. Handle 207 is made from the molding material of the present invention making it magnetically attracted to magnetic strip 201.

Figure 4:
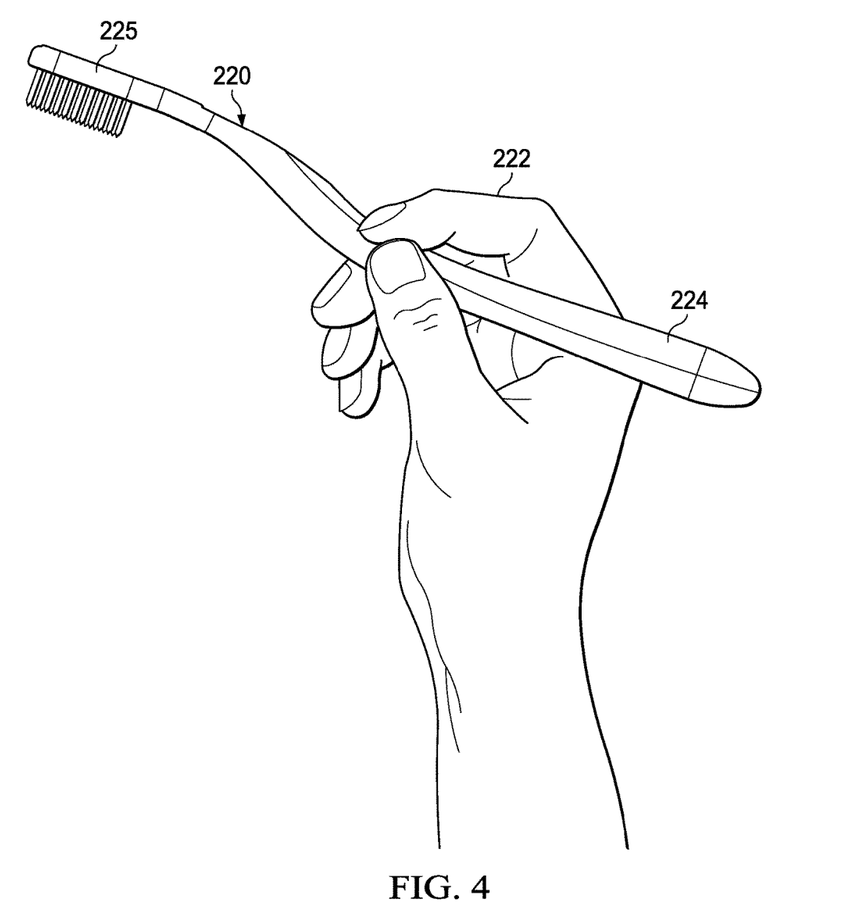
FIG. 4 is a view of a toothbrush with the handle made from the molding material of the present invention being held in a human hand.

Referring now to FIG. 4, there is shown a toothbrush 220 being held in a human hand 222. The toothbrush 220 comprises a handle 224 and head 225. Handle 224 is made from the molding material of the present invention. The molding material allows for control of the weight of the product in whatever location by the filler variation. Control of the product is required due to the relatively high weight of the product. The ability of the molding material of the present invention to fill any available cavities within the mold it is possible to use the mass/weight distribution of the material for adaption of the inertial moment of the finished product.

Figure 5:
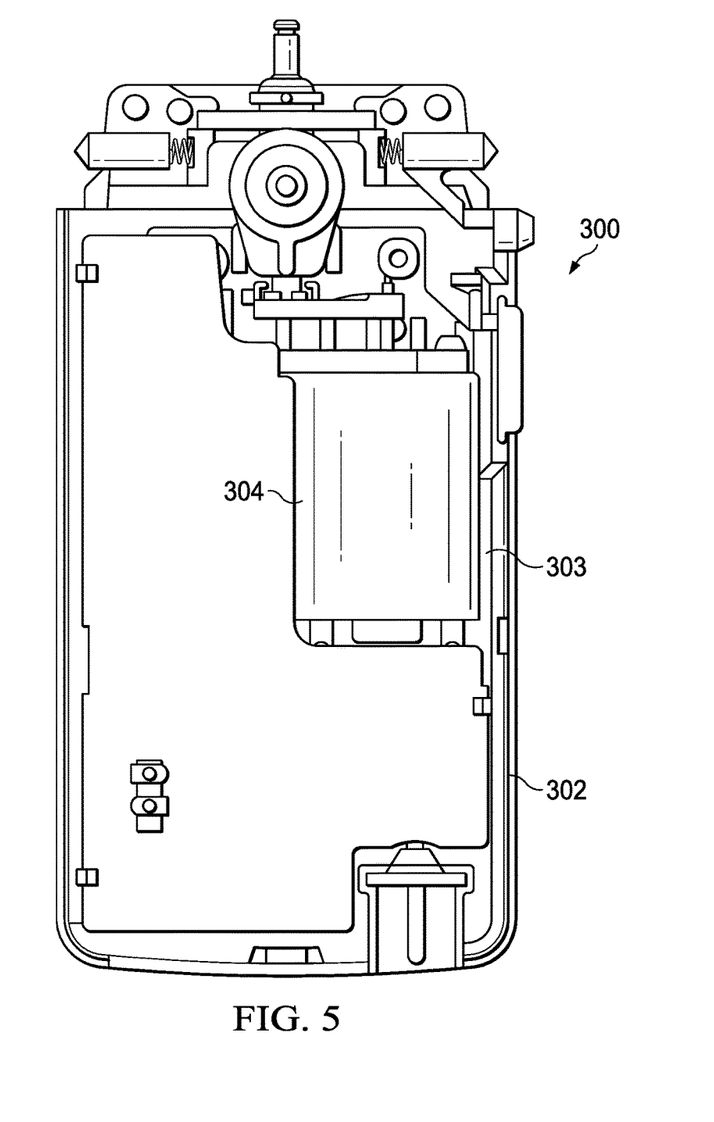
FIG. 5 is a view of an electrical appliance made of the molding material of the present invention.

The molding material of the present invention may be used in electrical appliances. The consumer is accustomed that electrical appliances have a specific weight that gives a comfortable feeling and the molding material can provide such a benefit. The molding material of the present invention may be used for damping behavior/noise reduction in electrical appliances. It may also be used to displace critical resonance frequencies and damp torsional vibration amplitudes in different appliances. Referring now to FIG. 5 there is shown an electrical shaver 300. Electrical shaver 300 comprises a shell 302. An empty cavity 303 may be filled with a solid object such as cylinder 304. Cylinder 304 is made from the molding material of the present invention. The heavy molding material of the present invention helps to dampen noise from vibration.

The molding material of the present invention has many uses including but not limited to handles or cartridges for razors, shavers, toothbrushes, etc. The molding material can be used in the packaging industry—high value packaging: lotion and crème cups and bowls, scent flasks and covers and lids for packages.

The molding material is extrudable and can be used as a weight component for the multi-material extrusion parts and for products that could be subsequently blow molded.
Combinations:
An example is below:
A. A molding material comprising
  from about 10 weight percent to about 25 weight percent of an amorphous thermoplastic resin, from about 3 weight percent to about 25 weight percent of aluminum oxide, boron nitride or aluminum silicate and from about 65 weight percent to about 87 weight percent of iron oxide.
B. The molding material of Paragraph A, wherein the amorphous thermoplastic resin is selected from the group consisting of: acrylonitrile butadiene styrene, polystyrene, and styrene acrylonitrile.
C. The molding material of Paragraph A, wherein the amorphous thermoplastic resin is a styrene resin.
D. The molding material of Paragraph C, wherein the styrene resin is styrene acrylonitrile.
E. A method of making an article comprising the steps of:
  a. providing an amorphous thermoplastic resin,
  b. providing aluminum oxide, boron nitride or aluminum silicate,
  c. providing iron oxide,
  d. mixing the amorphous thermoplastic resin, aluminum oxide, boron nitride or aluminum silicate and iron oxide into a molding material,
  e. heating the molding material mixture into a flowable molding material, and
  f. molding the flowable molding mixture into an article.
F. The method of Paragraph E, wherein the article is selected from the group consisting of: a handle, a razor handle, a toothbrush handle, a phone casing, a computer casing, a stapler, and shaver handle.
G. The method of Paragraph E, wherein the amorphous thermoplastic resin is styrene acrylonitrile.
H. The method of Paragraph E, wherein the amorphous thermoplastic resin is provided in a range from about 10 weight percent to about 25 weight percent, the aluminum oxide, boron nitride or aluminum silicate is provided in a range from about 3 weight percent to about 25 weight percent and the iron oxide is provided in a range from about 65 weight percent to about 87 weight percent.
I. The method of Paragraph E, comprising the additional step of: electroplating the article with a thermoplastic elastomer.
J. The method of Paragraph E, wherein the molding step is injection molding.
K. The method of Paragraph E, wherein the molding step is extrusion molding.
L. The method of Paragraph E, wherein a cooling time of the material can be decreased by increasing the amount of aluminum oxide, boron nitride or aluminum silicate provided in step b.
M. The method of Paragraph E, wherein a cooling time of the material can be increased by decreasing the amount of aluminum oxide, boron nitride or aluminum silicate provided in step b.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A shaving razor comprising:
a blade cartridge unit having at least one blade; and
a handle having a frame and a blade cartridge connecting assembly operatively connected to the frame and the blade cartridge unit, the blade cartridge connecting assembly comprising:
  a docking station releasably attached to the blade cartridge unit
  a pod operably coupled to the frame to rotate relative to the frame, and;
  an ejector button, wherein the blade cartridge connecting assembly is configured to rotate about an axis of rotation that is substantially perpendicular to the frame and wherein the blade cartridge unit is configured to rotate about an axis of rotation that is substantially parallel to the blade and substantially perpendicular to the handle.

2. The shaving razor of claim 1 wherein a shortest distance between the axis of rotation that is substantially perpendicular to the blades and substantially perpendicular to the frame and the axis of rotation that is substantially parallel to the blades and substantially perpendicular to the handle is about 10 mm to about 17 mm.

3. The shaving razor of claim 1 wherein a shortest distance between the axis of rotation that is substantially perpendicular to the blades and substantially perpendicular to the frame and the axis of rotation that is substantially parallel to the blades and substantially perpendicular to the handle is about 13 mm to about 15 mm.

4. The shaving razor of claim 1 wherein the pod generates a return torque to return to a rest position by a spring member when rotated.

* * * * *